(12) United States Patent
Stafford (10) Patent No.: US 12,082,525 B2
(45) Date of Patent: Sep. 10, 2024

(54) SHIELD AND ATTACHMENT FOR WEED TRIMMING

(71) Applicant: Vista Studios, Inc., White Bear Lake, MN (US)

(72) Inventor: Joseph Stafford, White Bear Lake, MN (US)

(73) Assignee: Vista Studios, Inc., White Bear Lake, MN (US)

( * ) Notice: Subject to any disclaimer, the term of this patent is extended or adjusted under 35 U.S.C. 154(b) by 304 days.

(21) Appl. No.: 17/739,604

(22) Filed: May 9, 2022

(65) Prior Publication Data

US 2023/0354741 A1 Nov. 9, 2023

(51) Int. Cl.
*A01D 34/416* (2006.01)
*A01G 3/06* (2006.01)

(52) U.S. Cl.
CPC ......... *A01D 34/4167* (2013.01); *A01G 3/062* (2013.01)

(58) Field of Classification Search
CPC .. A01D 34/4167; A01D 34/416; A01G 3/062; A01G 3/06; A01G 3/065; A01G 3/067
USPC ......... 30/286, 276, 277.4, 390, 391; 56/12.7
See application file for complete search history.

(56) References Cited

U.S. PATENT DOCUMENTS

| | | | |
|---|---|---|---|
| 4,987,681 A * | 1/1991 | Sepke | A01D 34/90 D8/8 |
| 6,327,782 B1 * | 12/2001 | Blevins | A01D 75/206 30/286 |
| 6,655,034 B2 * | 12/2003 | Richardson | A01D 34/90 30/286 |
| 7,111,404 B2 | 9/2006 | Hanes et al. | |
| 7,963,041 B1 | 6/2011 | Smith | |
| 9,433,146 B2 | 9/2016 | Hutchins | |
| 10,555,459 B1 | 2/2020 | Crockett | |
| 10,638,663 B2 | 5/2020 | Grande | |
| D931,695 S * | 9/2021 | Takla | D8/8 |
| 2016/0262306 A1 * | 9/2016 | Macedonio | A01D 34/4167 |

* cited by examiner

*Primary Examiner* — Phong H Nguyen
(74) *Attorney, Agent, or Firm* — Amanda M. Prose; Westman, Champlin & Koehler, P.A.

(57) ABSTRACT

A removable shield for a string trimmer with trimmer head for cutting tall grass or weed is a flexible shield having a first end and a second end with a length extending therebetween; a removable shield closure for securing the first end of the shield to the second end; one or more fasteners configured for coupling the shield to the string trimmer at one or more locations on the shield. The shield forms a perimeter ring having a height and an interior space when the shield closure secures the first end of the shield to the second end of the shield and wherein when installed on the string trimmer, the trimmer head is within an interior space of the perimeter ring when the shield is installed on the trimmer head.

16 Claims, 6 Drawing Sheets

SHIELD AND ATTACHMENT FOR WEED TRIMMING

BACKGROUND

The present invention relates to a shield for attaching to a handheld vegetation trimmer and more specifically to a removable, flexible shield wall for installation on a pre-existing trimmer which can be used to protect non-target vegetation from a trimming line of the trimmer.

Tall grass and/or weed trimmers using a cutting line are generally used to trim vegetation growth in tight areas where a lawn mower does not fit or cannot reach. These trimmers are also used in areas near the base of trees, plants, or other landscaping or hardscaping features. These weed trimmers are provided with a partial guard that encompasses only a section of the rotating head positioned along the drive shaft so as to allow an operator to see what they are trimming upstream and to trim in hard-to-reach areas. The guard may also shield the operator from debris that may be deflected downstream. Operational deficiencies of the traditional guards are a safety concern. Additionally, the open sections around the rotating head allow the cutting line to contact objects in the trimmers path which can be damaged by the string. These objects may most commonly be the bases of trees and plants as well as leaves of bushes for example. Thus, traditional trimmers may allow a user to cut tall grass or vegetation but may also result in unwanted pruning of other vegetation.

SUMMARY

An aspect of the present disclosure relates to a removable shield for a string trimmer with trimmer head for cutting tall grass or weed. The removable shield has a flexible shield wall having a first end and a second end with a length extending therebetween; a removable shield closure for securing the first end of the shield to the second end; and one or more fasteners configured for coupling the shield to the string trimmer at one or more locations on the shield. The shield forms a perimeter ring having a height and an interior space when the shield closure secures the first end of the shield to the second end of the shield and wherein when installed on the string trimmer, the trimmer head is within an interior space of the perimeter ring when the shield is installed on the trimmer head.

The one or more assembly fasteners each have a floor and two substantially parallel channels extending upwardly from the floor, wherein one channel is configured for receiving a surface of the shield and one channel is configured for receiving a surface of a guard cover on the string trimmer.

The one or more assembly fasteners further comprise a securing mechanism for one or both of the two channels for securing one or both of the shield and guard cover to the assembly fastener.

The securing mechanism comprises a latch, notch, set screw, pin, clip, tie, hook and loop fastener or combination thereof.

The shield closure comprises a main body having a channel on each opposing side of the main body, wherein a first channel is configured for receiving the first end of the shield and the second channel is configured for receiving the second end of the shield.

A securing mechanism is provided for one or both of the first channel and second channel to secure one or both of the first and second ends of the shield to the shield closure.

The securing mechanism comprises a latch, notch, set screw, pin, clip, tie, hook and loop fastener or combination thereof.

The shield has a height that extends above a top surface of the trimmer head when the shield is secured to the string trimmer.

The shield has an open top and an open bottom.

The flexible shield is comprised of plastic, Kevlar, reinforced rubbers, nylon, or combinations thereof.

A removable net is provided for securing over at least a portion of an open top of the perimeter ring.

The net is secured to a top edge of the perimeter ring.

The perimeter ring is configured for securing to the guard of the string trimmer on a first length of the perimeter ring and wherein the perimeter ring is not supported directly by the trimmer on a second length of the perimeter ring and wherein the second length of the perimeter ring is capable of bending or deforming when an outer surface of the second length of the perimeter ring is moved into contact with one or more structures.

Another aspect of the present disclosure relates to a shield attachment for a string trimmer. The shield attachment is a flexible annular wall having an open top, open bottom, a length and a height and providing an open interior space therein for a trimmer head of the string trimmer, and wherein the annular wall is removably attachable to the string trimmer, wherein the height of the annular wall extends above a height of the trimmer head when the annular wall is attached to the string trimmer; one or more mechanisms for securing one or more locations on the annular wall to a guard cover of the string trimmer wherein the one or more mechanisms are configured with parallel channels such that each one of the one or more mechanisms is secured to the annular wall and to the guard and secured between the annular wall and the guard such that the annular wall and the guard are not in contact at the one or more mechanisms. The one or more locations on the annular wall are spaced apart along a first length of the annular wall to a rear of the trimmer head and coextending with a perimeter length of the guard of the trimmer.

The shield attachment has a bumper configured to couple to a lower edge of the annular wall coextending along a length of the annular wall opposite the perimeter length of the guard trimmer.

The annular wall is comprised of a flexible material such that as the annular wall contacts objects outside the perimeter, the annular wall bends or flexes to prevent damage to the objects outside the perimeter of the annular wall.

Yet another aspect of the present disclosure relates to a method of protecting shrubbery, trees and non-target objects from a string trimmer by securing a first end of a flexible wall to a first position on a guard portion of the string trimmer with a first fastener; securing a second, opposing end of the flexible wall to a second position on the guard portion of the string trimmer with a second fastener; and moving the trimmer head to cut tall grass and weeds within in the perimeter formed by the flexible wall. The flexible wall extends upwardly from connection with the guard portion. A trimmer head of the string trimmer is within a perimeter formed by the flexible wall.

Securing the first end of the flexible wall to the second end of the flexible wall a closure mechanism forms a wall that is substantially continuous around its perimeter.

Securing ends of a web to a top surface of the flexible wall provides an open mesh net covering at least a portion a top opening of the flexible wall.

DETAILED DESCRIPTION

A shield device for use with various pre-existing string trimmers, edgers, weed trimmers or like handheld trimming and/or cutting devices with string or filament movement for cutting tall grass, weeds, vegetation and the like is described herein. The trimming devices, generally referred to herein after as "trimmers" are devices having a trimmer head which supports a cutting string length(s) or a cutting line thereon, and which "whips" the cutting line as it rotates at a speed sufficient for the cutting grass, weeds and like materials. The trimmer heads may also have a housing which supports and/or protects operational cutting or trimming components and which is mounted at a ground engaging end of a long handle. The trimmer head may be fitted with a cutting guard at a rear section of the trimmer head, or the trimmer handle itself may also have a cutting guard attachment at the ground engaging end of the handle. The cutting guard is generally a section of material provided on a rear or back side of the trimmer head and only provided a partial cover to the trimmer head so that the area in front of the trimmer head is visible and/r unobstructed for use. The cutting guard is generally a horizontally installed cover that extends a distance behind or away from the trimmer head and may have a short vertical wall at the terminal end of the horizontally positioned cover. This is a guard to protect the operator standing behind the trimmer head, and a variation of this guard is provided with most standard trimmers.

The shield device as described herein provides a vertical shield wall that extends around the trimmer head and extending upwardly therefrom. The shield bottom may be substantially level with the plane of rotation of the cutting line or substantially level with a lower end of the trimmer guard of the trimmer. The upper end of the shield is above the trimmer head. The shield device may act to surround the trimmer head with this vertical wall which is spaced apart the trimmer head such that in one or more embodiments, the cutting line is free to rotate its normal path without contacting an inner surface of the vertical shield wall. The shield device is a vertical wall forming a substantially enclosed perimeter around the trimmer head with an open top and open bottom. In one more embodiments the shield device is also comprised of a flexible material such that during use the perimeter shape may deform one or more sides as an outer surface of the shield contacts an element near the area being trimmed. For example, the shield may generally be installed and take the shape of a ring with an annular perimeter that is circular.

As the trimmer with the shield installed is used and the trimmer head is directed towards the base of a tree or bush, the tree or bush may contact an outer surface of the shield and the shield may temporarily deform to an oval shape allowing the cutting line to reach a larger surface area foot print without the cutting line extending beyond the shield and thus without the cutting line contacting the tree or bush. This flexibility aids in protecting other foliage not intended to be cut. This shield may be of increased value when used in gardens or fully landscaped areas with various types of plant life, allowing for the selective cutting of tall grass, weeds, or vegetation while protecting plants that are not targeted for trimming.

The shield device may be provided as a transparent, semi-transparent, translucent or opaque, generally rectangular in shape, sheet. That is, the shield may be provided in a flat manner for transport. The sheet may be produced by perimeter cutting of the shield shape, via die cutting or laser cutting for example. The sheet has a length that may be greater than its width (height when installed). The sheet may also have a substantially consistent width along the length of the sheet or may have a varied width along the length of the sheet to provide, for example, a higher shield section near the rear of the trimmer when installed. One or more openings in the shield may be provided to accommodate guide elements of a pre-existing trimmer. The shield wall may have one or more openings or spaces at a top location for allowing the handle of the trimmer to pass the shield wall. As the shield when installed as a height that extends from the trimmer head the handle needs to pass the through the shield wall.

The shield may be comprised of a flexible, durable plastic or like material. Further, the shield may be comprised of reinforced flexible materials, synthetic fiber-based materials such as Kevlar, Nomex or Technora. The shield may also be comprised of reinforced rubbers, nylon, and other materials such that the shield can withstand repeated contact with the cutting line in motion during trimming.

The length of the shield wall is securable to a guard element of the pre-existing trimmer and opposing ends of the shield may then be secured together to close the shield around a space which includes the trimmer head. In one embodiment, the sheet is secured to the pre-existing guard with one or more first customized clips for a removable but secure friction fit of the shield to the guard. The first customized clips may further be provided with additional fasteners or other mechanisms to secure the connection between the clip and the shield and/or the clip and the pre-existing guard. For example, the clip connects directly to a lower surface of the shield and concurrently to a lower surface of the pre-existing guard. The clip may concurrently connect to each of the shield and the guard, where the guard and the shield are not in contact at locations on or near the clip. The clip may be provided with substantially parallel channels, one channel for receiving a lower end of the shield and another channel for receiving a surface of the pre-existing guard or other surface of the trimmer.

A plurality of clips may be used to retrofit the shield to any existing trimmer with optional additional fastening devices such as wing nuts, clamps, or even hook and loop fasteners to retain the shield in place. The clips may be comprised of a hard and durable plastic or nylon material, metal, or reinforced rubber for example and may be formed by various methods including injection molding or 3D printing.

The shield may also be provided with a shield closure. The shield closure secures the opposing ends of the shield together as the shield is installed around the trimmer head. The shield closure may act to substantially enclose the space within the perimeter of shield by eliminating any gap between the opposing ends of the shield. This shield closure may allow the shield to be adjustably installed and/or universally installed. The circumference of the shield when installed can be adjusted by use of the shield closure in some embodiments. Further, the shield closure may also be used to vertically stabilize the shield when installed on the trimmer. In one embodiment, the shield closure is a panel for vertical installation. The height of the panel may be about the same or less than the height of the shield. The panel has a vertical body with channels on each opposing side length, each channel for receiving an end of the shield therein. Ends of the shield may be secured to the shield closure by way of a friction fit, snap mechanism, slide mechanism or combinations thereof. The shield ends may be further secured to the shield closure by clips, clamps, screws, pins, bolts, or other fasteners. In an additional embodiment, the shield closure may comprise a plurality of clips, clamps, ties, or other fasteners that may be positioned along the height of the shield and configured to secure the opposing ends of the shield together.

The shield closure may be comprised of a hard and durable plastic or nylon material, metal, or reinforced rubber for example and may be formed by various methods including injection molding or 3D printing.

Additionally, an optional lower guide may be provided and secured along the bottom, ground engaging end along any length of the shield. The lower guide may be a plastic, rubber or similar material having a length with a channel there along for receiving and coupling to a lower edge of the shield, for example. The lower guide may be configured to provide stability to the shield, to adjust overall or selected flexibility of the installed shield, and/or may be provided to customize shape of the perimeter of the shield when installed. The lower guide may also protect the lower end of the shield and/or protect other surfaces from the lower end of the shield moved thereacross.

The lower guide may be a plastic, rubber or similar material having a length with a channel there along for receiving and coupling to a lower edge of the shield, for example. The lower guide may be configured to provide stability to the shield, to adjust overall or selected flexibility of the installed shield, and/or may be provided to customize shape of the perimeter of the shield when installed. The lower guide may also protect the lower end of the shield and/or protect other surfaces from the lower end of the shield moved thereacross.

Additionally, an optional additional front guard section may be provided. The optional front guard section is a second flexible shield length that is securable to a length of the shield, such as a front section of the shield. The front guard can be secured as a second shield wall length extending along a portion of the shield wall and providing additional protection to the shield when the trimmer and shield are used in harsh environments, for example, when using the trimmer against or near concrete structures, wire fencing or other environments. The additional front guard section may be of a similar construction as the shield and having a shorter length than the shield. The additional front guard section is an optional attachment that may be secured to a selected length of the shield at a top and/or bottom section of the shield via clips, pins, adhesives, hook and loop fasteners or other removable fastening mechanisms.

The shield device installed on a trimmer provides a substantially continuous wall, with a substantially open top and open bottom. Optionally, a net attachment may be provided and removably secured to the shield to cover at least a portion of the open top. The net may be secured by tension to an upper edge of the shield and as the shield is flexible, the net may move with the shield. The net attachment also comprises a central disc which is positional above or over the trimming head and thus the net is secured between the upper edge of the shield and a perimeter of the disk. The net may be an open mesh having a size sufficient to prevent clippings as well as debris from being ejected upwardly through the otherwise open top. The mesh may also have a size sufficient to allow a user to see through the mesh and thus have visual access to the trimming line and trimming path.

Figure 1:
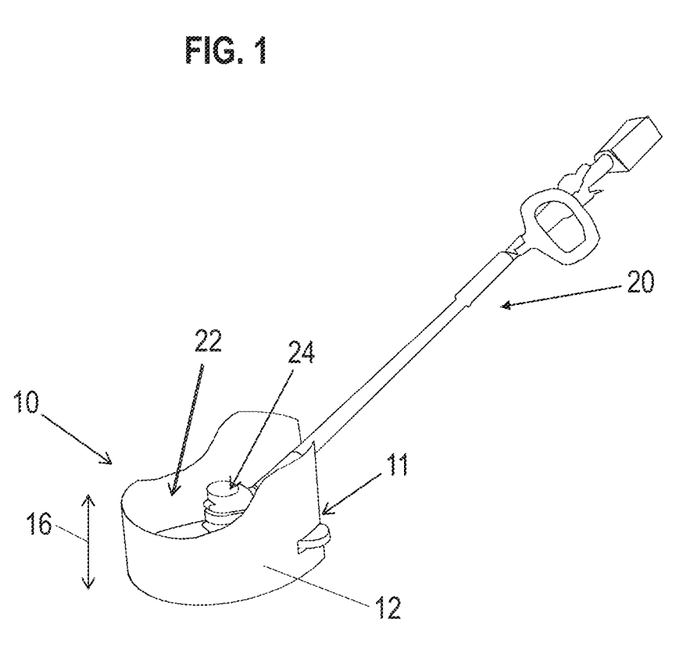
FIG. 1 is a front perspective view of one embodiment of a shield removably coupled to a trimmer.
Figure 2:
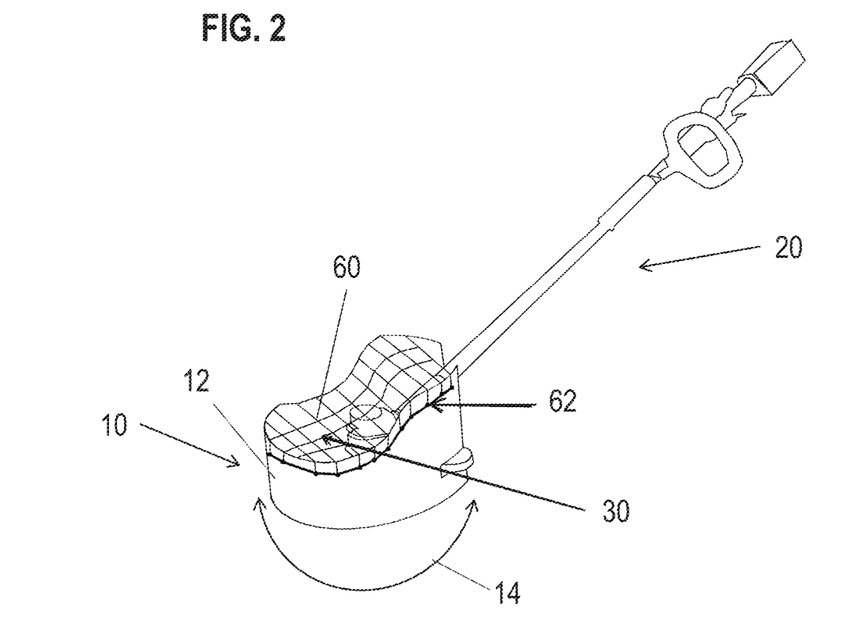
FIG. 2 is a front perspective view of another embodiment of a shield removably coupled to the trimmer and including an optional net attachment.

A removable, flexible shield 10 for a trimmer 20 is illustrated in FIGS. 1-7. As shown in FIGS. 1-2, the shield 10 comprises a side or perimeter wall 12 having a length 14 and a height 16. When installed on a guard 18 of a trimmer 20, the shield 10 surrounds an interior space 22 where a trimmer head 24 is located therein. The shield 10 may have one or more openings 11 in the perimeter wall 12 to accommodate a guide wheel or other elements on the trimmer 20. Opposing ends 26a, 26b of the length 14 may be secured together by one or more shield closures 28 to form the perimeter to the interior space 22. Optionally, a net 30 may be secured over an open top 32 of the shield 10. A bottom 34 of the shield 10 is also open.

Figure 3:
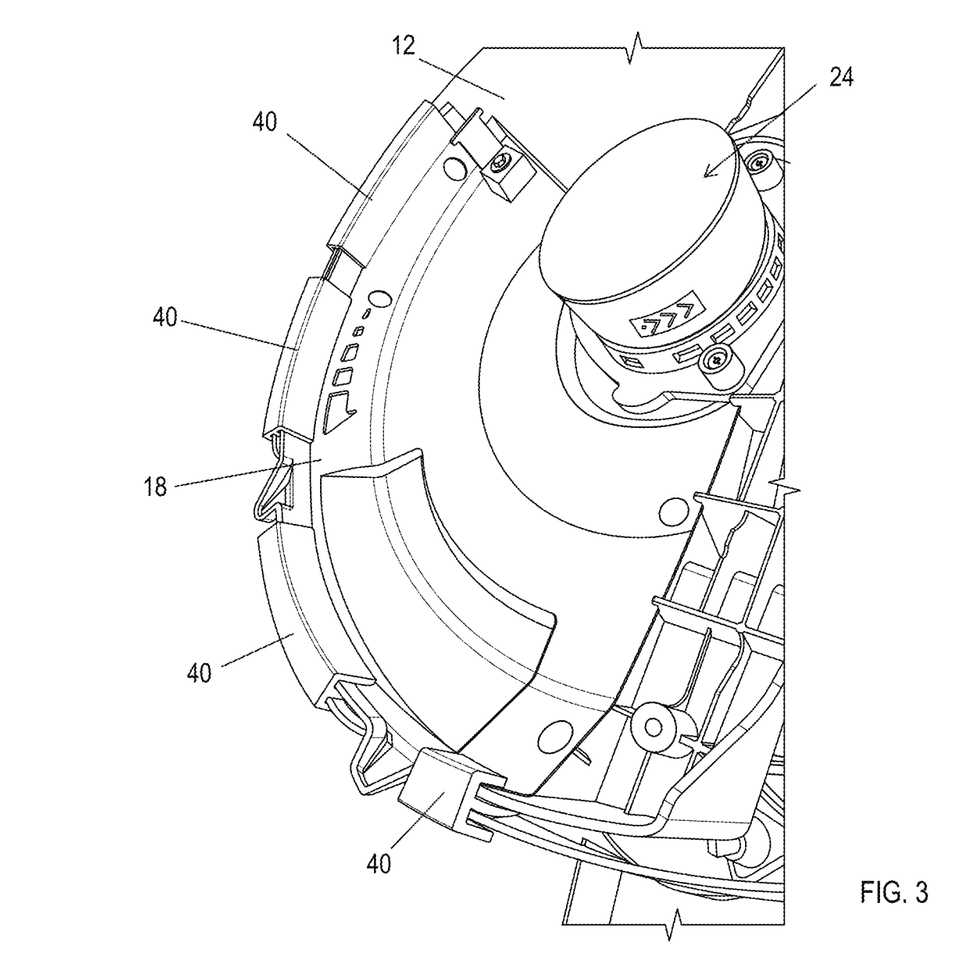
FIG. 3 is a bottom view of the attachment of a shield to a guard of the trimmer.

As illustrated in FIG. 3, the shield 10 may be secured to a surface of the trimmer 20, such as the guard 18 provided on the trimmer 20, such that at least a portion of the shield 10 is vertically supported by the trimmer 20. A second portion 36 of the shield 10 is not supported directly by the trimmer 20. At one or more points along the portion 36 of the shield 10, the shield may be flexible and/or bendable to change the shape of the interior space 22 when exterior surfaces 38 the shield 10 are displaced by outside objects, such as the base of plant or tree.

Figure 4:
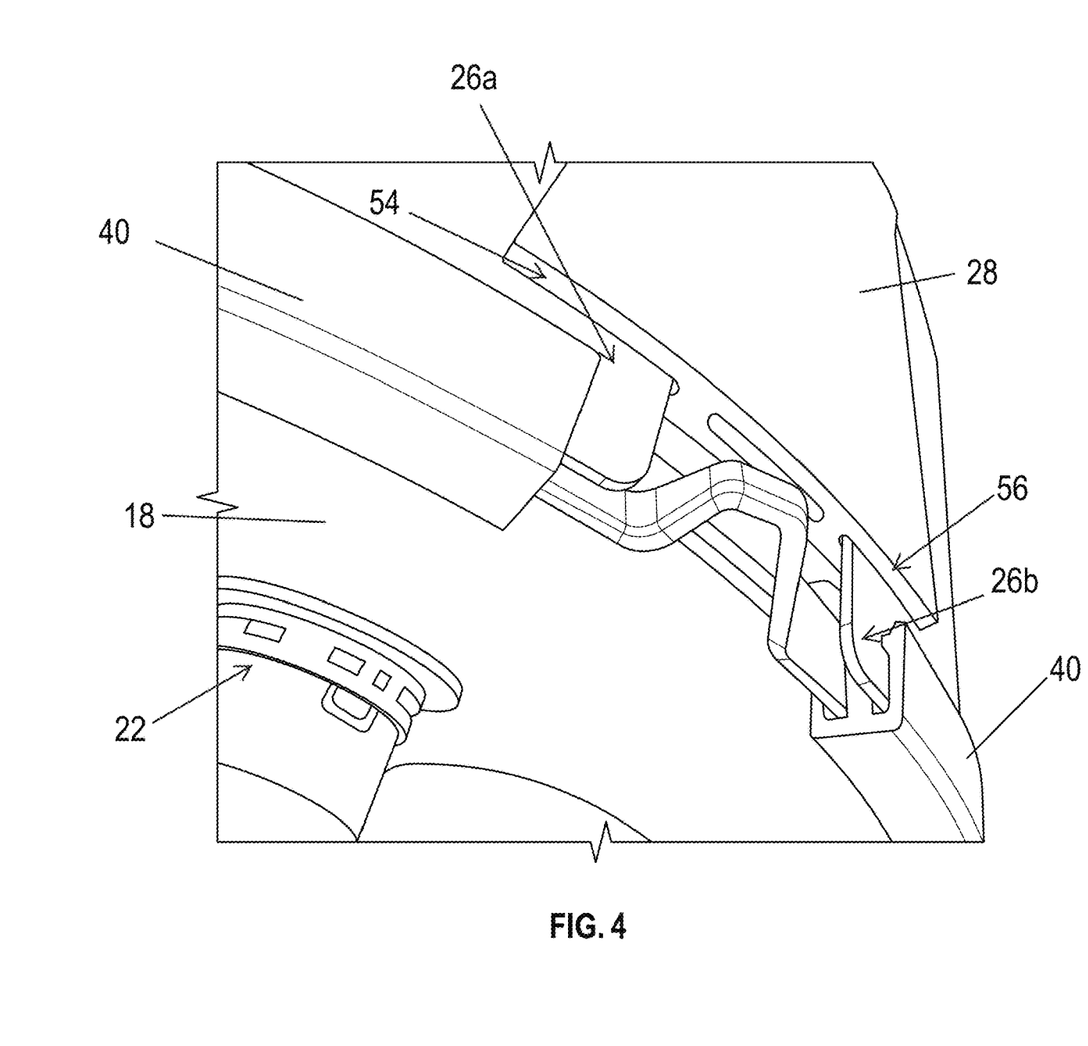
FIG. 4 is a top view of a shield closure device and shield secured to the trimmer.
Figure 5:
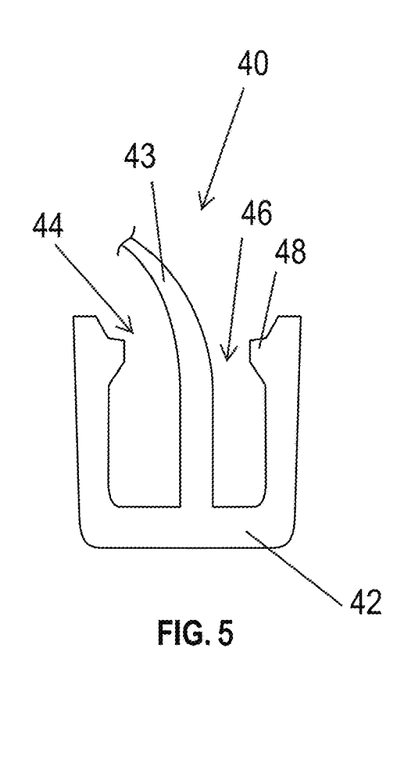
FIG. 5 is a bottom view of the shield closure device and shield secured to the trimmer.

As illustrated in FIGS. 4 and 5, one or more installation clips 40 may be provided for securing the shield 10 at one or more locations to the guard 18. For example, the shield 10 is removably secured to the guard 18 at a first location on the guard as the length 14 of the shield 10 then extends away from this first location and surrounds the trimmer head 24 in an annual manner to form a ring spaced apart around the trimmer head 24. This ring comprises the vertical wall 12 which extends upwardly from connection of the lower end of the vertical wall 12 with the guard 18. As mentioned above, this generally annular perimeter bounds the interior open space 22 in which the trimmer head 24 is positioned and includes space sufficient for the cutting line of the trimmer head to rotate and cut grass, weeds, or other vegetation within the interior space 22.

Additional clips 40 may be provided to secure the shield 10 to the guard at one or more second locations. The clips 40 may have the same or different lengths and the clips 40 may have a curvature along their length or otherwise have some flexibility to match the curvature of the guard when secured thereto. The shield 10 may optionally have one or more openings and/or notches at a lower end of the shield and near the opposing ends 26a, 26b of the shield wall 12 for coupling to clips 40 for installation. Additional openings or notches may also be provided along the height 16 of the ends 26a and 26b for coupling to the shield closure 28.

As illustrated in further detail in FIG. 5, in one embodiment the one or more installation clips 40 comprise a clip body 42 having a first channel 44 and a second channel 46. The channels 44 and 46 are separated by a wall 43 and the wall may optionally have a curved length or end for additional clamping force applied to the guard 18. The channels 44 and 46 are configured for receiving a lower end of the shield wall 12 and a lower end of the guard 18 therein, respectively. One or both of the channels 44 and 46 may be provided with a latch 48 for further securing the surface of the shield 10 and/or guard 18 provided in the respective channel 44 and/or 46. Additionally or alternatively to the latch 48, one or both of the shield wall 12 and/or guard 18 may further be secured in the respective channel 44 and/or 46 with an additional fastener such as a set screw, pin, additional clip or other fastener provided with the clip 40. The one or more installation clips may be provided in different lengths for coupling the shield wall 12 to the guard 18 at different locations and openings or notches in the shield wall 12 may correspond to those lengths.

Figure 6:
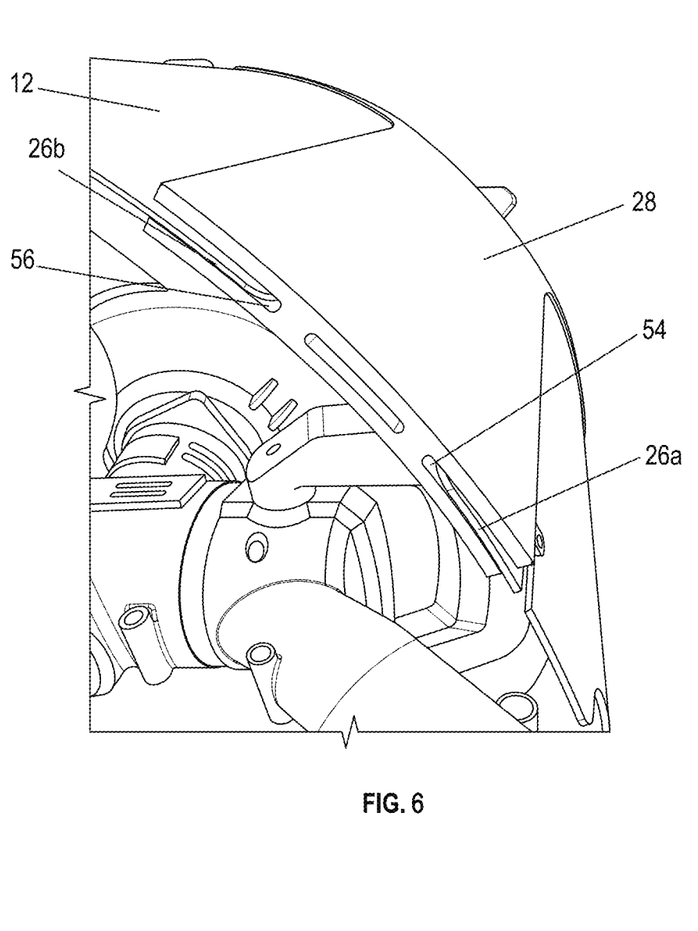
FIG. 6 is a side view of shield attachment mechanism.

Referring to FIGS. 4 and 6, one or more shield closures 28 may be provided for securing the ends 26a, 26b of the shield 10 together to enclose the trimmer head 24 within the interior space 24. As illustrated in FIG. 6, the shield closure 28 is a main body 50 with a length 52 and opposing channels 54 and 56 extending along opposing sides of the length 52. These channels 54 and 56 have a width and depth sufficient to receive an end 26a, 26b of the shield 10 therein for a friction fit. One or both of the channels 54 and 56 may be provided with a latch or corresponding aperture(s) for one or more additional fasteners such as a set screw, pin, clamp, clasp, additional clip or other fastener provided with the shield closure 28.

Figure 7:
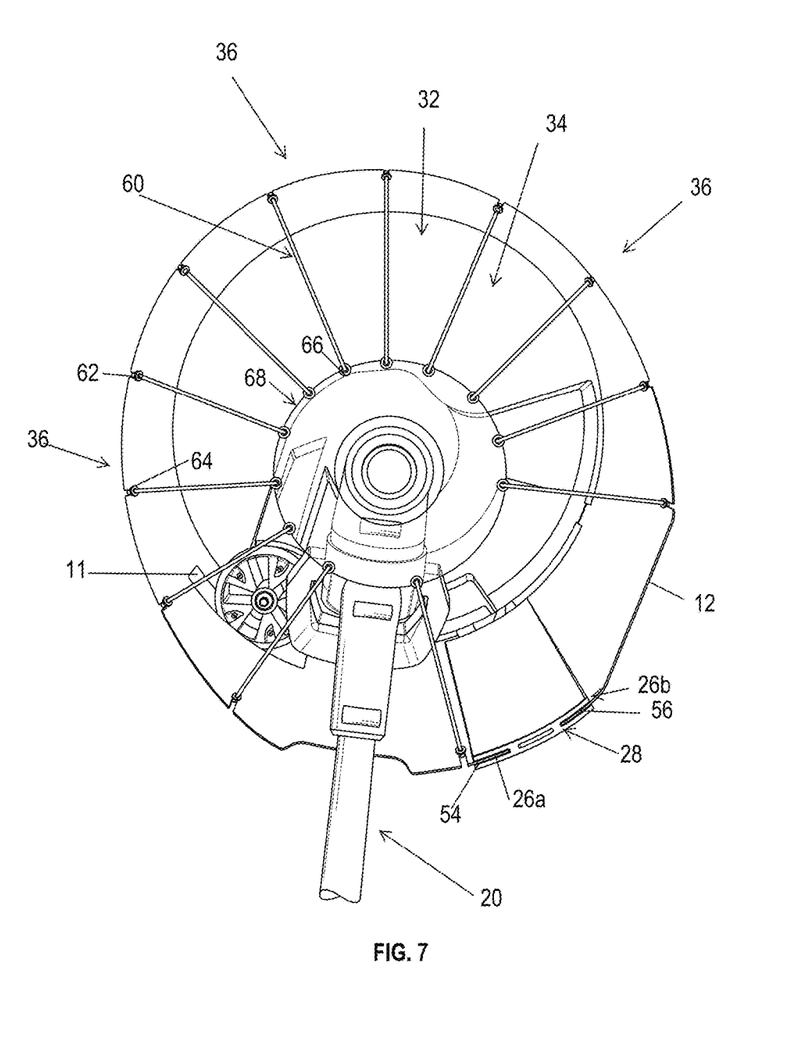
FIG. 7 is a top view of the shield attached to the trimmer with an optional net assembly provided thereon.

A net 30 attachment is illustrated in FIG. 7. The net 30 attachment may be supported on a web 60 where outer ends 62 of the web 60 are removably secured to an upper end of the wall 12 along the length 14 of the wall via apertures 64 in the wall 12 of the shield 10. The ends 62 may inserted into the apertures and secured there through or otherwise secured to the top of the shield 10. Inner ends 66 of the web 60 may be attached to a disc 68 having a diameter that substantially matches the diameter of the trimmer head of the trimmer 20. When installed on the shield 10 installed over the interior space 22, the net 30 extends across the open top of the shield 10 with the disk 68 positioned over the trimmer head of the trimmer. In one embodiment the outer ends 62 of the web 60 extend beyond an edge of the net 30 such that a handle of the trimmer 30 may easily extend upwardly without the net 30 being caught around the handle. Additionally, or alternatively, the disk 68 may have a slit and/or opening for allowing the handle to pass therethrough.

The ends 62 of the web 60 may further be provided with clips or other fasters for coupling to the apertures 64 in the wall 12 of the shield 10. The web 60 allows the net 30 be secured and tensioned over the shield 10. The tension of the net 30 may be adjustable, but the net is sufficiently tensioned across the shield 30 so as to prevent the net from hanging or drooping and thus risking be caught by the cutting line or tangled in or around the trimmer head. Alternative mechanisms including but limited to clips, clamps, magnets, and hook and loop fasteners for removably securing the net 30 over the open top of the shield 10 are contemplated and within the scope of this disclosure.

The shield according to one or more embodiments described herein is removable and thus can be selectively installed on a trimmer. The shield can be secured on the trimmer with clips and additional fasteners as desired.

The shield wall itself is flexible. Flexibility allows for installation on the trimmer. Further, as the shield and trimmer are used, for example, to clear weeds or tall grass around bushes or plants with bulk and foliage near the ground, the shield wall may flex, bend, or move such that a distance between the shield and the cutting line may change and vary. The shield wall may flex or bend around the base of the plant or the trunk of a tree. This means that the shield can effectively move the leaves or foliage with low ground clearance out of the way or otherwise hold or push back the leaves or foliage. The cutting line then can reach the tall grass or weeds near and around the base of the plant. This provides for improved trimming without damaging the plant. Similarly, if needed, tall grass or weeds at or near the trunk of tree can be cleared without damaging the trunk with the trimming line.

The shield is also at least a dual-purpose shield in that it can protect the user from airborne debris if the trimmer head is passed over pebbles or other loose material as well as protect trees, shrubs, flowers and other plants from being shredded by the filament cutting line of the trimmer.

Although the present disclosure has been described with reference to preferred embodiments, workers skilled in the art will recognize that changes may be made in form and detail without departing from the spirit and scope of the disclosure.

The invention claimed is:

1. A removable shield for a string trimmer with trimmer head for cutting tall grass or weed, the removable shield comprising:
    a flexible shield wall having a first end and a second end with a length extending therebetween;
    a removable shield closure for securing the first end of the shield to the second end; and
    one or more fasteners configured for coupling the shield to the string trimmer at one or more locations on the shield,
    wherein the shield forms a perimeter ring having a height and an interior space when the shield closure secures the first end of the shield to the second end of the shield and wherein when installed on the string trimmer, the trimmer head is within an interior space of the perimeter ring when the shield is installed on the trimmer head.

2. The removable shield of claim 1 wherein the one or more assembly fasteners each comprise:
    a floor; and
    two substantially parallel channels extending upwardly from the floor, wherein one channel is configured for receiving a surface of the shield and one channel is configured for receiving a surface of a guard cover on the string trimmer.

3. The removable shield of claim 2 wherein the one or more assembly fasteners further comprise a securing mechanism for one or both of the two channels for securing one or both of the shield and guard cover to the assembly fastener.

4. The removable shield of claim 3 wherein the securing mechanism comprises a latch, notch, set screw, pin, clip, tie, hook and loop fastener or combination thereof.

5. The removable shield of claim 1 wherein the shield closure comprises a main body having a channel on each opposing side of the main body, wherein a first channel is configured for receiving the first end of the shield and the second channel is configured for receiving the second end of the shield.

6. The removable shield of claim 5 and further comprising a securing mechanism for one or both of the first channel and second channel to secure one or both of the first and second ends of the shield to the shield closure.

7. The removable shield of claim 6 wherein the securing mechanism comprises a latch, notch, set screw, pin, clip, tie, hook and loop fastener or combination thereof.

8. The removable shield of claim 1 wherein the shield has a height that extends above a top surface of the trimmer head when the shield is secured to the string trimmer.

9. The removable shield of claim 1 wherein the shield has an open top and an open bottom.

10. The removable shield of claim 1 wherein the flexible shield is comprised of plastic, Kevlar, reinforced rubbers, nylon, or combinations thereof.

11. The removable shield of claim 1 and further comprising a removable net for securing over at least a portion of an open top of the perimeter ring.

12. The removable shield of claim 11 wherein the net is secured to a top edge of the perimeter ring.

13. The removable shield of claim 1 wherein the perimeter ring is configured for securing to the guard of the string trimmer on a first length of the perimeter ring and wherein the perimeter ring is not supported directly by the trimmer on a second length of the perimeter ring and wherein the second length of the perimeter ring is capable of bending or deforming when an outer surface of the second length of the perimeter ring is moved into contact with one or more structures.

14. A shield attachment for a string trimmer comprising:
a flexible annular wall having an open top, open bottom, a length and a height and providing an open interior space therein for a trimmer head of the string trimmer, and wherein the annular wall is removably attachable to the string trimmer,
wherein the height of the annular wall extends above a height of the trimmer head when the annular wall is attached to the string trimmer;
one or more mechanisms for securing one or more locations on the annular wall to a guard cover of the string trimmer wherein the one or more mechanisms are configured with parallel channels such that each one of the one or more mechanisms is secured to the annular wall and to the guard and secured between the annular wall and the guard such that the annular wall and the guard are not in contact at the one or more mechanisms; and
wherein the one or more locations on the annular wall are spaced apart along a first length of the annular wall to a rear of the trimmer head and coextending with a perimeter length of the guard of the trimmer.

15. The shield attachment of claim 14 and further comprising a bumper configured to couple to a lower edge of the annular wall coextending along a length of the annular wall opposite the perimeter length of the guard trimmer.

16. The shield attachment of claim 14 wherein the annular wall is comprised of a flexible material such that as the annular wall contacts objects outside the perimeter, the annular wall bends or flexes to prevent damage to the objects outside the perimeter of the annular wall.

* * * * *